Patented Jan. 25, 1944

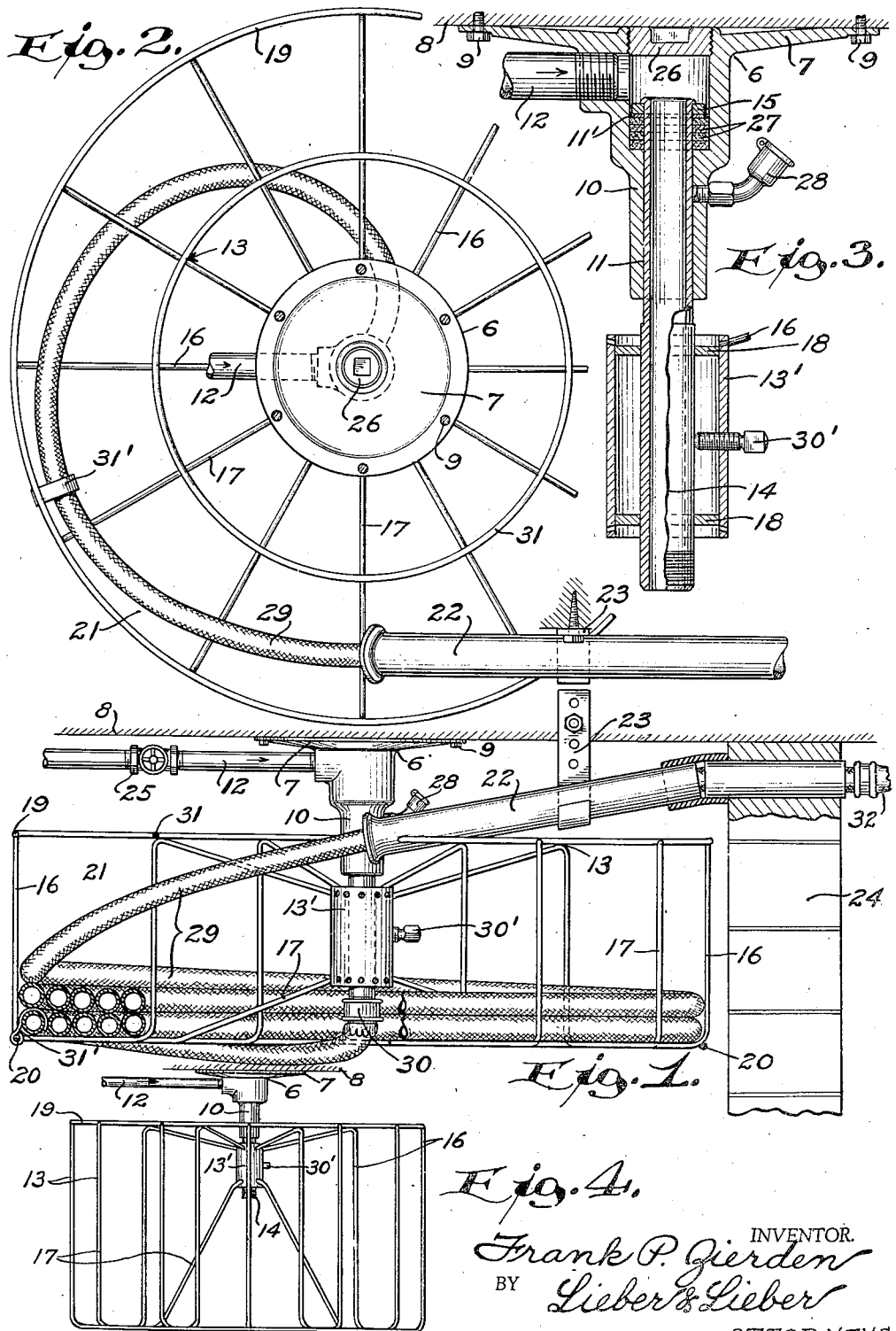

2,339,901

UNITED STATES PATENT OFFICE 2,339,901

HOSE REEL

Frank P. Zierden, St. Francis, Wis.

Application August 17, 1942, Serial No. 455,145

3 Claims. (Cl. 299—77)

The present invention relates in general to improvements in the art of coiling elongated flexible elements such as rubber hose, and relates more specifically to various improvements in the construction and operation of hose reels especially adapted to wind garden hoses or the like.

An object of the invention is to provide an improved hose reel assemblage which is simple and compact in construction, and which is moreover highly effective in use.

Many different types of reels for winding garden hose or the like, into coil formation, have heretofore been proposed, and in some of these prior devices the inlet end of the hose was coupled to the hub, and the liquid supply was admitted through a pipe which provided a journal bearing for the revolving reel. The pivotal supports for some of these previous hose reels were mounted upon portable carriages, while in others the supports were fixedly mounted upon stationary structure; but in most cases the reel was suspended for rotation about a horizontal axis and was provided with a crank or handle for effecting manual rotation thereof. Because of the friction resulting from this horizontal suspension of the reel, it was necessary to provide a hand crank or to grasp the periphery of these prior reels in order to effect turning thereof; and in order to so turn the winding reel it was also necessary for the operator to have direct access to the rotor of the reel assemblage. These prior hose reels moreover did not make provision for properly and effectively guiding the hose so that it would automatically neatly coil or wind itself upon the rotor, and therefore did not permit housing the reel assemblage within a basement or other enclosure so as to protect the hose and preclude tampering therewith.

Some of the more specific objects of this invention may therefore be enumerated as follows:

To provide a new and useful garden hose reel adapted to be mounted within an enclosure such as a basement, and to be effectively actuated from the exterior of the enclosure for either winding or unwinding of the hose, and without necessitating direct contact between the reel rotor and the operator.

To provide an improved hose reeling assemblage having the rotor suspended for free rotation with minimum frictional resistance, and wherein the hose is delivered to and from the rotor in a manner which will insure most effective coiling and unwinding thereof.

To provide a compact and durable hose reel which can be readily installed and safely operated, and which is devoid of dangerous projections extending beyond the confines of the revolving hose receiving basket.

To provide an improved hose reel assemblage which is adapted to automatically and neatly coil the hose, which requires no excessive attention, and which can be manufactured and installed at moderate cost.

To provide a hose reel basket which may be formed primarily of wire and thoroughly dynamically balanced so as to insure smooth operation and easy manipulation by a novice.

To provide a hose coiling assemblage which is always available for quick use, and in which the hose may be readily stored when not in use, within a protective enclosure, and which is adapted to receive and store hoses of maximum length in relatively compact condition.

To provide an improved hose guide assembly for hose reels, wherein the force of gravity assists in insuring uniform coiling or winding of the hose.

To provide an improved hose reel suspension unit which is simple and compact in construction and highly efficient in use, and which may be caused to interchangeably cooperate with winding baskets of different capacity.

To provide various improvements in the construction of hose reel baskets, which will insure neat and compact coiling of the hose within the reel rotor, and free withdrawal of the hose therefrom.

To provide an improved guide assemblage for conducting the hose into and out of the reel basket, which may be readily adjusted to insure most efficient operation of the reel.

To provide various other improvements in the construction and operation of hose reels whereby the adaptations or uses thereof is enhanced to a maximum with minimum effort on the part of the user.

These and other specific objects and advantages of the present invention will be apparent from the following detailed description.

A clear conception of the several features constituting the present improvement, and of the mode of constructing and of operating garden hose reels built in accordance with the invention, may be had by referring to the drawing accompanying and forming a part of this specification in which like reference characters designate the same or similar parts in the various views.

Fig. 1 is a part sectional side elevation of an improved hose reel installation confined within an enclosure and showing the water inlet pipe disposed in the plane of the view;

Fig. 2 is a fragmentary top view of the hose reel assemblage of Fig. 1;

Fig. 3 is an enlarged central vertical section through the improved hose reel suspension mechanism; and Fig. 4 is a side elevation drawn to reduced scale, and showing a basket of larger capacity than that of Fig. 1, interchangeably suspended from the same reel suspension mechanism as shown in Figs. 1 and 3.

While the invention has been shown and described herein as being specifically embodied in a hose reel formed primarily of wire and especially adapted for winding or coiling rubber garden hose within a basement or the like for domestic use, it is not my desire or intent to thereby unnecessarily restrict the scope or utility of the improvement, since the novel features are also more generally applicable to industrial installations.

Referring to the drawing, the improved garden hose reel shown therein, comprises in general, a bracket 6 having an upper suspension plate 7 adapted for attachment to overhead structure 8 by means of bolts 9 or the like, and also having an elongated tubular or hollow support 10 formed integral with and depending from the plate 7 and provided with an internal vertical guide bearing 11 and a liquid supply pipe 12; a rotor or reel 13 having a central supporting hub 13' detachably secured to an approximately upright hollow spindle or pipe 14 which is journalled in the bore of the support 10 and which is also provided with a thrust collar 15 coacting with a thrust bearing plate 11', the hub 13' also having a series of U-shaped wires 16 and intervening wires 17 radiating from the end portions thereof above and below internal bearing flanges 18, and these wires being interconnected at their outer portions by upper and lower rings 19, 20 so as to provide an upwardly open U-shaped peripheral recess 21; and a tubular hose guide 22 fixedly but adjustably suspended from the overhead structure 8 by means of a vertically adjustable bracket 23, and being directed tangentially and downwardly at a slight variable angle into the upper open end of the recess 21.

The stationary bracket 6 may be formed of one piece or of separate pieces rigidly united as by welding; and may be fixedly suspended from any suitable structure 8 such as a basement ceiling or joists, preferably near an outer wall 24; and while the liquid supply pipe 12 is shown as being directed toward this wall, in actual practice this pipe 12 preferably extends parallel to the wall so that the shut-off valve 25 therein may be actuated from the outside with the aid of a long range control rod or key operatively connected to the valve handle in a well known manner. The bracket 6 is preferably suspended so that the axis of the bore of the hollow support 10 is disposed approximately vertical, and access to this bore and to the thrust and guide bearing elements may be effected by means of a removable pipe plug 26. The depending tubular support 10 is preferably of considerable vertical length and rigidly formed so as to withstand side thrust, and the hollow spindle may be formed of a single piece of heavy pipe having its upper portion turned to smaller diameter so as to provide a snug journal fit within the bore of the support 10; while the thrust ring or collar 15 which coacts with the internal thrust bearing plate 11' may be rigidly secured to the upper extremity of the pipe 14 by spreading the upper pipe end as shown, or by shrinking the collar upon the pipe. The thrust bearing plate 11' with which the thrust collar 15 coacts, loosely embraces the spindle 14 and rests upon packing material 27 disposed within a recess formed in the bracket 6 above the guide bearing 11; and since the weight of the parts which are suspended from the spindle pipe 14 compresses the packing 27 and prevents escape of liquid, an oil cup 28 may be provided for lubricating the guide bearing 11.

The rotor or reel 13 comprises the spindle 14, supporting hub 13', and the wire basket having the annular peripheral upwardly open recess 21 for receiving and coiling a flexible hose 29 as shown in Fig. 1, and the lower end of the hub spindle or pipe 14 is provided with standard threads for detachable attachment of the inlet end of the hose 29 thereto, with the aid of a standard coupling 30. The hub flanges 18 may be rigidly attached to the outer hub 13' by welding or otherwise, and the hub is adapted to be rigidly but detachably secured to the heavier lower portion of the spindle 14 by means of one or more set screws 30'. The radial wires 16, 17 of the reel basket are preferably equally spaced about the central vertical axis of the support 10 in order to insure accurate balancing of the rotor structure, and alternate radial wires 16 are formed with deep upwardly open U-shaped outer portions and have their inner ends rigidly attached to the upper portion of the outer hub 13', while the upper portions of these wires adjacent to the inner side of the annular recess 21 are rigidly interconnected by means of a wire stiffening ring 31. The intervening radial wires 17 have vertical outer end portions and horizontal lowermost portions the same as the corresponding portions of the wires 16, but the inner ends of these wires 17 are rigidly attached to the lower portion of the outer hub 13' and they are not connected to the inner ring 31. The outer vertical parallel portions of all of the radial wires 16, 17 are rigidly interconnected by the upper and lower outer rings 19, 20, and all of the wires and rings may be welded or otherwise firmly united so as to provide a durable reel or basket structure. In order to cause the hose 29 to most effectively coact with the peripheral portion of the basket, the lower ring 20 is also provided with a hose engaging hook 31' as shown in Figs. 1 and 2.

The wire hose reel baskets are preferably manufactured in several sizes adapted to hold standard hose lengths of one hundred or two hundred feet, but the hubs 13' of all of the reel baskets are of like construction so that all of the various size baskets may be interchangeably applied to the same spindle pipe 14. In Fig. 1 the wire basket 13 is relatively low and of lesser capacity, while in Fig. 4 the basket 13 is of the same diameter but deeper and of greater capacity. Any of these baskets 13 may be readily removed and interchanged with another, by merely releasing the set screws 30', and these clamping set screws also serve to permit vertical adjustment of the rotor baskets 13 so as to vary the head room between the ceiling support 8 and the top of the basket, or to insure proper cooperation of the hose receiving recess 21 with the tangential guide 22. This removability of the wire baskets 13 also permits the same to be withdrawn from the suspension brackets 6, and to be used independently of the latter if so desired.

The tubular hose guide 22 should be of sufficient internal diameter to permit free advancement of the hose 29 therethrough, and while the end of this guide which is disposed above the upwardly open recess 21, is preferably inclined downwardly into and is fixedly adjustable relative to this recess as shown in Fig. 1, the opposite end of the guide 22 may be extended through the wall 24 and disposed approximately horizontal. The bracket 23 which supports the inclined inner portion of the guide 22 is vertically adjustable with the aid of the suspension screw which is adapted to coact with any one of several holes in this bracket, so as to vary the inclination of the guide tube. The outer end of the flexible hose 29 is provided with a nozzle 32 which preferably cannot pass through the tubular guide 22 but which may be removed for withdrawal of the hose, and the stationary portion of the guide 22 may be fixedly supported in any desired manner, but the guide should preferably be of considerable length and directed tangentially of the annular recess 21 as illustrated in Fig. 2. This guide tube 22 may be formed of any durable material, and while the lower end of the inclined portion of the guide 22 may be disposed more or less within the upper open end of the recess 21, the tangential disposition thereof is important.

After the improved hose reel assemblage has been properly constructed and installed in an enclosure, and adjusted as described, its normal use is a simple matter. If the hose 29 has been previously wound upon the rotor or reel 13 as depicted in Fig. 1, unwinding of the hose may be readily effected without directly touching the reel, by merely grasping the nozzle 32 and pulling the flexible hose through the tubular guide 22 to any desired extent. During this procedure, the wire basket will be freely revolved and the axle pipe 14 will freely rotate within the fixed tubular support 10, about the central vertical axis of this support, in a counterclockwise direction as viewed in Fig. 2. The liquid supply valve 25 may then be manipulated to admit liquid under pressure to the interior of the hollow bracket 6 and from thence through the hollow spindle pipe 14 to the hose 29, whereupon the nozzle 32 may be opened or closed at will; and after sprinkling has been effected, the valve 25 may again be shut-off. In order to rewind or coil the hose 29 upon the reel, it is only necessary for the operator to push the longitudinally stiff but laterally flexible hose through the tubular tangential guide 22 from the exterior of the enclosure or wall 24, and without directly touching the rotor 13. The relatively stiff hose 29 emerging from the inner end of the fixed guide 22 and entering the annular recess 21, will initially engage the outer vertical sections of the wires 16, 17 due to the action of the hook 31', thereby imparting rotative impulses to the basket. As the basket continues to rotate, the hose 29 will gradually be wound about the annular series of inner vertical sections of the wires 16, 17, and this action will convert the intermittent propelling impulses into smooth continuous rotation of the basket. The hose 29 will thus be automatically and neatly coiled or wound within the rotor recess 21 as shown in Fig. 1, and while the feeding of the hose into the basket is relatively intermittent, the inertia of the revolving reel and increasing hose coils will effectively convert this feeding motion into smooth continuous rotation. The reel will accept the hose at any speed, and the successive coils of hose will be automatically formed and superimposed upon each other until the entire hose length has been wound upon the reel. After the valve 25 has been closed, the coiled hose may be readily drained by merely releasing the coupling 30.

From the foregoing detailed description, it will be apparent that my invention provides an improved hose reel assemblage which is extremely simple and compact in construction, and highly flexible and effective in use. The improved reel assembly is easily operable from the exterior of a housing or enclosure, through the medium of the hose alone, by virtue of the improved formation and disposition of the adjustable tubular guide 22, and the hose may be quickly housed within a protective enclosure in extremely compact and neatly wound condition. The relatively deep upwardly open annular recess 21 formed by the radial basket wires 16, 17 makes it possible to utilize gravity to insure proper winding, and the downwardly open central depression formed by the inner inclined ends of the wires 17 makes it possible to attach the coupling 30 to the lower end of the hose pipe 14 entirely within the rotor 13 and above the bottom thereof. This feature eliminates undesirable projections beyond the confines of the basket, and while it is preferable to form the reel 13 of standard wire, this construction is not essential. The detachable hub 13' and spindle pipe 14 is important in order to permit the use of a standard bracket for reels 13 of various sizes, and the improved suspension of the pipe 14 by means of a thrust bearing located directly above and resting upon the packing 27 simplifies the structure and eliminates packing nuts. This construction also prevents water from collecting within the guide bearing 11, and the latter may be maintained properly lubricated. The rotation of the reel 13 about an approximately vertical or upright axis, and the dynamically balanced formation thereof, are important in securing best results, and the assemblage should also be durably constructed so as to withstand normal abuse. The improved structure can be manufactured at moderate cost, easily installed, and has proven highly satisfactory in actual use.

It should be understood that it is not desired to limit this invention to the exact details of construction, or to the precise mode of installation and operation, herein shown and described, for various modifications within the scope of the claims, may occur to persons skilled in the art.

I claim:

1. In combination, a support fixedly suspended from above and having an upper liquid supply chamber and an upright bore extending downwardly from the chamber, a hollow upright spindle journalled for rotation within said bore and having its upper end in open communication with said chamber while its lower end portion projects downwardly beyond said bore, a thrust collar secured to the upper end of said spindle and being constantly exposed to downward pressure within said chamber, packing interposed only between said thrust collar and said support at the upper end of said bore, the lower end of said bore being constantly open to the ambient atmosphere for free drainage of liquid escaping from said chamber past said packing, and a hose reel basket suspended from the lower projecting portion of said spindle and having an annular upwardly open hose receiving recess.

2. In combination, a support fixedly suspended from above and having an upper liquid supply chamber and an upright bore extending downwardly from the chamber, a hollow upright spindle journalled for rotation within said bore and having its upper end in open communication with said chamber while its lower end portion projects downwardly beyond said bore, a thrust collar secured to the upper end of said spindle and being constantly exposed to downward pressure within said chamber, packing interposed only between said thrust collar and said support at the upper end of said bore, the lower end of said bore being constantly open to the ambient atmosphere for free drainage of liquid escaping from said chamber past said packing, a hose reel basket suspended from the lower projecting portion of said spindle and having an annular upwardly open hose receiving recess, and means for effecting adjustment of said basket along said spindle toward and away from said support.

3. In combination, a support fixedly suspended from above and having an upper liquid supply chamber and an upright bore extending downwardly from the chamber, a hollow upright spindle journalled for rotation within said bore and having its upper end in open communication with said chamber while its lower end portion projects downwardly beyond said bore, a thrust collar secured to the upper end of said spindle and being constantly exposed to downward pressure within said chamber, packing interposed only between said thrust collar and said support at the upper end of said bore, the lower end of said bore being constantly open to the ambient atmosphere for free drainage of liquid escaping from said chamber past said packing, a hose reel basket suspended from the lower projecting portion of said spindle and having an annular upwardly open hose receiving recess, means for effecting adjustment of said basket along said spindle toward and away from said support, a hose guide having its lower end directed tangentially into the open top of said recess and being provided with a flexible suspension at its upper end located laterally adjacent to said support, and means for swingably adjusting said lower guide end relative to the bottom of said recess.

FRANK P. ZIERDEN.